July 13, 1926.
J. K. BOWEN
1,592,653
VENTILATOR CAP FOR FILLER OPENINGS OF AUTOMOBILE RADIATORS
Filed Nov. 22, 1924
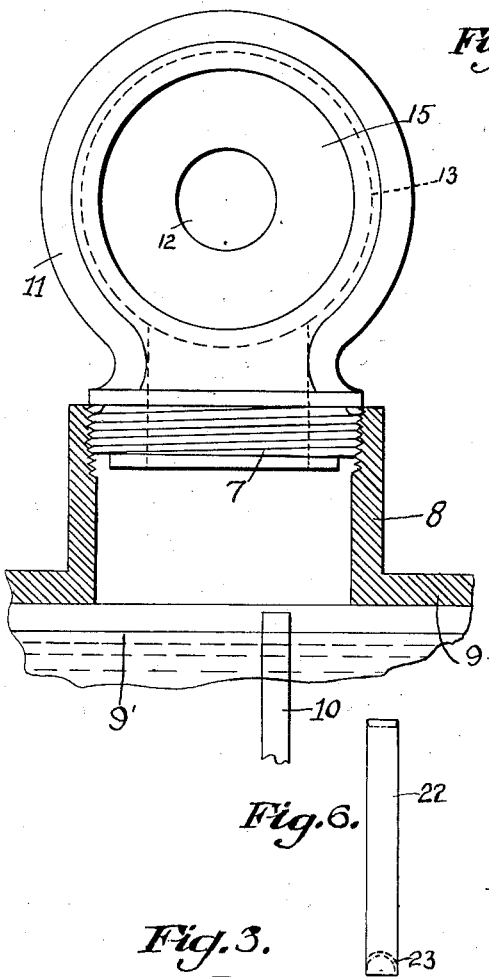
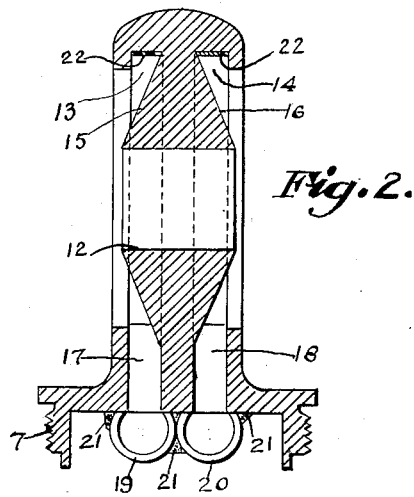
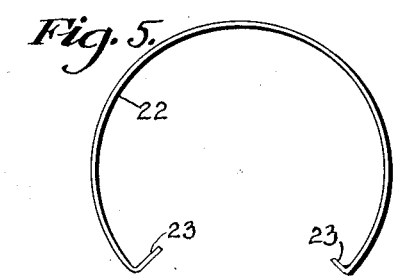
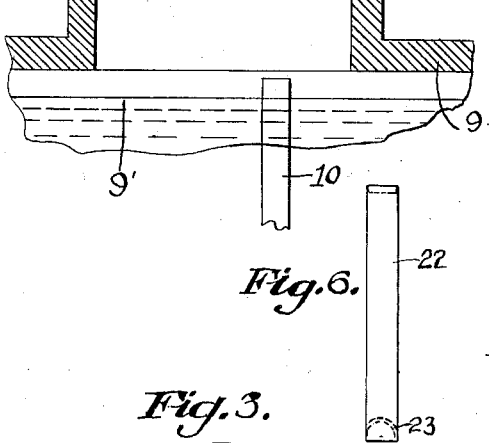
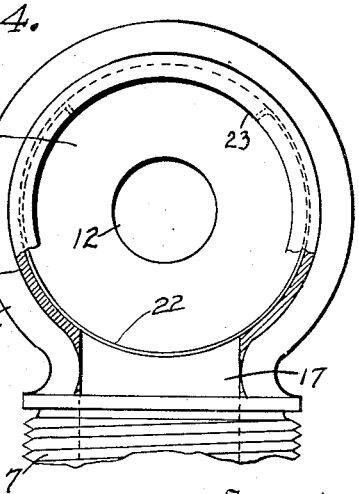
Inventor
J. K. Bowen
By his Attorney Patented July 13, 1926.

1,592,653

UNITED STATES PATENT OFFICE.

JAMES K. BOWEN, OF ALLENTOWN, PENNSYLVANIA.

VENTILATOR CAP FOR FILLER OPENINGS OF AUTOMOBILE RADIATORS.

Application filed November 22, 1924. Serial No. 751,476.

This invention relates to radiators for motor vehicles connected in circulation with the liquid cooling jacket of an internal combustion engine and arranged at the front of the vehicle, said radiators comprising a top header or reservoir connected to the engine jacket to receive the incoming heated liquid, a second header or lower reservoir being connected to the inlet of the engine jacket, and said reservoir connected by passages to conduct the liquid from the upper to the lower reservoir in thin streams, the liquid being cooled as it flows through said passages by the impingement of the air against the passages and passing through the spaces between the same as the vehicle is propelled forward, and it is the object of the present invention to provide means for connection to radiators of this character to facilitate the cooling of the cooling liquid.

Radiators of this character are entirely closed with the result that there is a tendency for the liquid to become heated more quickly and to a higher temperature due to the confining of the heated air and vapors above the liquid level in the upper reservoir, and in carrying out the present invention means are provided to displace said heated air and vapors by cool air, which means may be applied to a convenient part of the radiator but is preferably applied to the closure cap for the filler opening thereof by arranging the cap with openings in communication with the air space arranged at said filler opening and communicating with the space in the radiator above the liquid level therein, and arranging the cap with means to induce the displacing of the heated air through one of said openings and the entrance of cool air through another opening through the movement of the vehicle.

In the drawing accompanying and forming a part of this specification Figure 1 is a front elevation of a closure cap for the filler opening of a radiator constructed and arranged with an embodiment to carry out the invention, only so much of the radiator being shown as is essential to an understanding of the invention.
Figure 2 is a cross sectional view of the closure cap taken substantially midway through Figure 1.

Figure 3 is a view looking at the bottom of the closure cap.
Figure 4 is a view similar to Figure 1, partly broken away and in section, to show the arrangement of means for closing the openings through the cap; and Figures 5 and 6 are front and side elevations, respectively, of means to close the openings in the filler cap.

Similar characters of reference designate like parts throughout the different views of the drawing.

As stated an embodiment of the invention is shown as applied to a closure cap for the filler opening of the radiator which is arranged with a part 7, in the present instance, screw threaded, for releasable connection to the filler opening arranged in a neck 8 of a radiator 9 for the cooling liquid and connected in circulation with a jacket extending around the cylinder or cylinders of an internal combustion engine of a motor vehicle, said radiators being arranged at the front of the vehicle for the impingement of the air thereagainst as the vehicle is propelled forward, only so much of the radiator being shown as is essential to an understanding of the invention. The neck 8 projects above the liquid level in the radiator. Furthermore, to maintain the liquid at a predetermined level in the radiator, as shown at 9', there is provided an overflow pipe 10 the inlet end of which normally projects slightly above the liquid level and as expansion of the liquid takes place due to the heating thereof it is drawn off through said overflow pipe.

The part of the cap for connecting the same to the filler opening is arranged with an upwardly extending portion 11, in the present instance of circular shape, although it may be of any other suitable conformation, and of less thickness than the diameter, and has an opening 12 centrally or axially therethrough. The cap is positioned so that a flat side of said projecting portion 11 will extend transversely to the direction of travel of the vehicle whereby the air will be impinged against the same. The portion 11 is arranged with a pair of annular recesses 13, 14 in the front and rear walls concentric with the central opening 12 and adjacent the margin or peripheral portion, said front and rear walls inclining or diverging from the wall of the central opening 12 to said recesses, as shown at 15 and 16 in Figure 2. Openings 17, 18 lead from said annular recesses through the connecting part 7 of the cap to the interior of the cap and in communication with the air space above the liquid level in the radiator.

The device as described functions to displace the heated air and vapor by cool air above the liquid level in the radiator, which cooled air also serves to cool the liquid in the reservoir, and functions substantially as follows: As the vehicle is propelled forward the air impinged against the inclined or conical surface 15 is deflected and directed by such surface to and through the opening 17 into the radiator. The air strikes against the inclined surface 15 with considerable force due to the travel of the vehicle, and by making the part through which the opening 12 extends of considerable thickness, this low temperature will be retained therein with the result that the temperature of the air entering the opening 17 will be reduced.

It will be obvious that as the air strikes against the portion 11 that a portion thereof will pass at a high velocity through the opening 12, and by the arrangement of the recess 14 with the opening 18 leading from the interior of the radiator to said opening the stream of air passing through the opening 12 will create a suction and draw air and vapors from the radiator through the opening 18. This drawing of the air from the radiator through the opening 18 further induces a flow of air into the radiator through the opening 17.

To prevent splashing of the liquid from the radiator through the openings 17, 18 by the sloshing and surging of the liquid in the radiator through the movement of the vehicle, baffles are provided for the openings 17, 18 within the cap and radiator. These baffles comprise tubes 19, 20 having a portion of the side wall cut away and mounted on and secured to the interior of the cap by solder or otherwise, as shown at 21, to extend transversely thereof with the tubes in communication with the openings 17, 18 through the cutaway portions of the tubes, as clearly shown in Figure 2. These tubes form passages extending transversely of the cap open at opposite ends to the interior of the cap and radiator.

At certain times, as for instance in winter, the motor will not develop a heat any greater than to heat the cooling liquid to a temperature not higher than is necessary to the efficient operation of the engine, and means are therefore provided to shut off the entrance of cooling air to the radiator and the withdrawal of heated air from the radiator. While this may be any suitable means there is shown for this purpose a bow shaped member 22 substantially of the width of the recesses 13, 14 one of which members is mounted in each of said recesses. Normally these members are positioned so that the ends will be at opposite sides of the openings 17, 18, whereby the interior of the radiator will be open to the atmosphere through said openings. To close and shut off the interior of the radiator from the atmosphere through said openings the bowed members are adjusted in the recesses 17, 18 so that an intermediate portion of said members will extend over the openings, as shown in Figure 4, thereby effectively closing the same. To facilitate the adjustment of the closure means the ends are bent inwardly as shown at 23.

Having thus described my invention I claim:

1. A cap for the filler opening of the radiator of a motor vehicle arranged with a part for connection to the filler opening, said part having a portion projecting upward for the impingement of the air against the same with a central opening therethrough, an annular recess at the front of said projecting portion, openings through the portion of the cap arranged for connection with the filler opening, one of said openings communicating with the annular recess and the other opening arranged at the rear of the projecting portion, and passages within and extending transversely of the cap and open at opposite ends communicating with both openings.

2. A cap for the filler opening of the radiator of a motor vehicle arranged with a part for connection to the filler opening, said part having a portion projecting upward for the impingement of the air against the same with a central opening therethrough, openings at the front and rear of said projecting portion, passages within and extending transversely of the cap and open at opposite ends communicating with said openings, and means to close said openings.

3. A cap for the filler opening of the radiator of a motor vehicle arranged with a part for connection to the filler opening, said part having a portion projecting upward for the impingement of the air against the same with a central opening therethrough, annular recesses at the front and rear of said projecting portion about the central opening, openings through the part of the cap for connection to the filler opening leading from said annular recesses, and passages within and extending transversely of the cap and open at opposite ends communicating with said openings.

4. A cap for the filler opening of the radiator of a motor vehicle arranged with a part for connection to the filler opening, said part having a portion projecting upwardly for the impingement of the air against the same with a central opening therethrough, annular recesses at the front and rear of said projecting portion concentric with the central opening, passageways through the part of the cap arranged for connection with the filler opening, said passageways leading from said annular recesses to the interior of the cap, and resilient bowed members engaging in the annular recesses adjustable to shut off or open said openings to the annular recesses.

5. A cap for the filler opening of the radiator of a motor vehicle arranged with a part for connection to the filler opening, said part having a circular upwardly projecting portion of less thickness than diameter to be positioned for impingement of the air and having an opening centrally therethrough, annular recesses concentric with the central opening in the front and rear of said circular projecting portion, the front and rear walls of said circular projecting portion diverging from the central opening to said recesses, and passageways through the portion of the cap arranged for connection with the filler opening, said passageways being in communication with each of said recesses.

Signed at New York city in the county of New York and State of New York this 18th day of November, 1924.

JAMES K. BOWEN.